3,412,124
PROCESS FOR THE PREPARATION OF
ALKYLALUMINUM HALIDES
Giorgio Moretti, Milan, and Gianfranco Corsi, Ferrara,
Italy, assignors to Montecatini Edison S.p.A., Milan,
Italy
No Drawing. Filed Feb. 19, 1963, Ser. No. 259,740
Claims priority, application Italy, Feb. 21, 1962,
3,389/62
7 Claims. (Cl. 260—448)

The present invention relates to a new method for preparing alkylaluminum halides having the general formula:

$$R_mAl_pX_n$$

wherein R is alkyl, X is halogen, $m$ and $n$ are whole numbers, $m+n=3$ when $p=1$, and $m+n=6$ when $p=2$.

These aluminum organometallic compounds are widely employed as components for stereospecific catalysts used in the polymerization of olefins and, therefore, several methods for preparing these compounds have been developed.

Hitherto the most profitable of these methods was based on the reaction:

(1) $\quad 2AlR_3 + AlX_3 \rightarrow 3AlR_2X$ wherein R and X have the above indicated meanings.

By suitably varying the ratios between $AlR_3$ and $AlX_3$, all the various alkylaluminum halides may be obtained.

In order to fully utilize this method, however, perfectly anhydrous aluminum trihalides must be available. This requirement presents difficulties due to the hygroscopic nature of these halides.

Another known method for preparing alkylaluminum halides consists essentially in reacting dialkylaluminum monohydrides with aluminum trihalides according to the equation:

(2) $\quad 3R_2AlH + AlX_3 \rightarrow AlH_3 + 3R_2AlX$

In comparison with reaction (1), this method possesses the advantage of employing as starting material a hydride which is the intermediate product obtained in the preparation of aluminum trialkyls. Thus, this hydride is easily obtained by merely not carrying out the second synthesis step to produce the trialkyl.

In fact, it is known that when the reaction for the preparation of aluminum trialkyls from aluminum, olefin and hydrogen:

(3) $\quad Al + 3C_nH_{2n} + 3/2H_2 \rightarrow Al(C_nH_{2n+1})_3$ is carried out with an excess of aluminum and hydrogen and while gradually introducing the ethylene, a partial synthesis occurs according to the following reaction:

(4) $\quad Al + 2C_nH_{2n} + 3/2H_2 \rightarrow Al(C_nH_{2n+1})_2H$

The dialkylaluminum monohydride subsequently reacts with further amounts of olefin thereby being converted to trialkylaluminum according to the equation:

(5) $\quad Al(C_nH_{2n+1})_2H + C_nH_{2n} \rightarrow Al(C_nH_{2n+1})_3$

Nevertheless, this known method (2) for preparing alkylaluminum halides does possess, in comparison with method (1), the drawback of yielding only one mol of alkylaluminum halide per mol of alkylaluminum hydride used.

We have now found an improved method for the preparation of alkylaluminum halides which combines the advantages of the above mentioned known methods, without exhibiting the drawbacks thereof.

It is therefore an object of the present invention to provide an improved process for producing alkylaluminum halides.

Other objects of the invention and some advantages thereof will become hereinafter apparent.

This method comprises reacting dialkylaluminum monohydride with aluminum trihalide and an olefin, according to the equation:

(6) $\quad 2Al(C_nH_{2n+1})_2H + AlX_3$
$\quad\quad\quad\quad + 2C_nH_{2n} \rightarrow Al(C_nH_{2n+1})_2X$ By suitably varying the ratios between the monohydride and the aluminum trihalide all the alkylaluminum halides may be obtained.

In particular the following alkylaluminum halides, where the alkyl groups contain from 2 to 4 carbon atoms, may be obtained: monohalides of diethyl-, dipropyl-, di-n-butyl-, di-i-butyl-aluminum; sesquihalides of ethyl-propyl-, n-butyl-, i-butyl-aluminum; dihalides of mono-ethyl-, monopropyl-, mono-n-butyl, mono-i-butyl-aluminum. Thus, the particular alkylaluminum halide desired will determine the particular stoichiometric amounts of the hydride and trihalide employed.

The ratio between the monohydride and the olefin, however, is always constant and corresponds to a molar ratio of about 1:1.

As mentioned above, this novel process combines the advantages of the more effective known methods namely: (a) the possibility of obtaining from one mol of alkylaluminum several mols of alkylaluminum halide; and (b) the use of the mono-hydride thus avoiding the second synthesis step needed for the production of trialkyls.

In the particular case where ethylene is the olefin, another advantage of the process according to the present invention with respect to method (1) should be noted. When the trialkylaluminum is prepared from aluminum, ethylene and hydrogen according to reactions (3), (4) and (5), the ethylene has a tendency to add itself to the ethyl radicals already bound to aluminum, thus resulting in the formation of higher alkyl aluminum.

This tendency increases as time progresses owing to the reaction between the hydride and ethylene, and the increased amounts of aluminum triethyl produced. Hence, there is an advantage in stopping the reaction at the hydride formation stage, without allowing further alkylation up to aluminum triethyl, so as to obtain as the starting aluminum ethyl compound a product which is essentially free of higher aluminum alkyls.

The monohydride obtained according to reaction (4) contains, as the only impurity, significant amounts of the corresponding aluminum trialkyl. This compound, however, cannot be considered an undesirable impurity with regard to the process of the present invention, inasmuch as these aluminum trialkyls themselves react, under the hereinafter specified reaction conditions, with the aluminum trihalides, according to reaction (1), to yield the desired aluminum alkyl halides.

The dialkylaluminum monohydride prepared according to reaction (4) may therefore be employed as such, without having to subject it to a purification process, which would unfavorably affect the economical operation of the process.

It is therefore apparent that the process of the present invention may be applied to any dialkylaluminum monohydride regardless of its method of preparation.

The optimum conditions for carrying out the process of the present invention comprise mixing the aluminum trihalide with the dialkylaluminum monohydride at room temperature, heating the mixture at 50°–100° C., preferably at about 60° C., for a variable time which depends on the particular temperature used, and adding the olefin under a pressure of 1–20 atmospheres while maintaining a temperature of 50°–100° C., preferably 70°–85° C.

It is preferred, in accordance with what has been stated above, not to directly mix the olefin with aluminum hydride and trihalide, in order to avoid the possibility that these aluminum compounds might catalyze the cationic polymerization of a portion of the olefin.

The following examples are given to illustrate the present invention. The invention, however, is not limited to these specific embodiments.

EXAMPLE 1

Into an autoclave kept under a nitrogen atmosphere and equipped with vertical blade stirrer, a thermometer sheath, manometer, valves and oil circulation jacket for maintaining it in the thermostatic state, there is introduced 318 g. of $AlCl_3$ (2.38 mols) and then 435 g. of a product prepared from aluminum, ethylene and hydrogen (at a temperature of 100° C. under a pressure of 200 atm., while operating in an excess of aluminum and hydrogen). This product has an aluminum content of 29.7% (equal to 4.8 gram atoms of aluminum) and is made up essentially of $Et_2AlH$ (wherein $Et=C_2H_5$).

After mixing both these materials, the autoclave is heated, while under agitation, at 70° C. and is kept at this temperature under a nitrogen atmosphere, while always maintaining the stirring action, for one hour. Subsequently ethylene is continuously introduced through a valve while maintaining in the autoclave initially a pressure of 1–2 atm. and then a pressure of 5 atm. over a total period of 6 hours. After cooling, the contents of the autoclave are discharged and the product distilled under high vacuum to obtain 764 g. of clear distilled liquid. Upon analysis the following elements are found therein: $Al=21.7\%$ and $Cl=28.7\%$. In decomposition of the product with 2-ethylhexyl alcohol, 363 N ml./g. of a gas are released which contains the following molar percents: 99% ethane, 0.8% butane and 0.2% hydrogen. The product is therefore aluminumdiethyl monochloride which has the following theoretical values: $Al=22.4\%$; $Cl=29.4\%$; with the amount of gas theoretically released being 372 N ml./g.

EXAMPLE 2

40.5 g. of $AlCl_3$ (0.303 mole) are introduced, under a nitrogen atmosphere, into a 3-necked glass flask immersed in oil bath and equipped with stirrer, reflux cooler, thermometer sheath, gas inlet pipe and dropping funnel. 51.2 g. of $Et_2AlH$, prepared as described in Example 1 (containing 29.5% aluminum corresponding to 0.56 g. atom of Al), are introduced from a dropping funnel.

The mass is stirred for 30 minutes; and inner temperature rises slowly from 20° to 30° C. and then drops down again. The $AlCl_3$ dissolves slowly in $Et_2AlH$ and an homogeneous, very viscous mass is formed. Subsequently, this mass is heated, while under stirring, to a temperature up to 70° C. Vacuum is formed in the apparatus, and then ethylene is introduced so as to continuously impinge on the surface of the stirred viscous mass, while keeping in the apparatus an ethylene overpresusre of 10–15 cm. Hg. The operation is conducted at 70° C. for 32 hours and at 85° C. for additional 24 hours.

At the end of this time, the jelly-like product is transformed into a movable, colorless liquid which is distilled under high vacuum. 69 g. of distilled product are obtained possessing the following analytical characteristics:

$$Al=24.62\%$$

and $Cl=29.23\%$ upon decomposition with 2-ethylhexyl alcohol; 336 N ml./g. of a gas are released which contains the molar percentages: 98% ethane and 2% butane. This product is essentially made up of $Et_2AlCl$.

EXAMPLE 3

110 g. of $AlCl_3$ (0.825 mole) and 150 g. of $Et_2AlH$ diluted with 400 ml. of anhydrous heptane are charged into an autoclave while operating according to the technique described in Example 1. The organometallic hydride, prepared as set forth in Example 1, contains 29.45% aluminum (i.e., 1.64 g. atoms of Al) and upon decomposition with 2-ethylhexyl alcohol releases a gas containing molar percentages of 33% hydrogen and 2.4% butane, the balance being ethane.

After mixing the two reactants, the mixture is brought to 60° C., is heated under stirring in a nitrogen medium at temperatures up to 60° C. for one hour. It is then brought to 70° C. and ethylene is charged to the autoclave while maintaining a pressure varying between 4 and 5 atm., for 6 hours.

The mixture is discharged, the heptane is evaporated and then the remaining product is distilled under high vacuum, to obtain 270 g. of distilled product possessing the following mol percentages: $Al=21\%$, and $$Cl=29.65\%$$

Upon decomposition of the product with 2-ethylhexyl alcohol, 348 N ml./g. of a gas are released which is composed of (by moles) 98.5% ethane and 0.8% butane. The product is thus essentially composed of $Et_2AlCl$.

EXAMPLE 4

302 g. of $AlCl_3$ (2.26 moles) are charged, under nitrogen, into an autoclave while employing the procedures described in Example 1. The autoclave is heated at a temperature of 60° C. while stirring, and 430 g. of a hydride product are rapidly added.

This product contains 28.6% of aluminum (equal to 4.55 g. atoms of aluminum) and is prepared by the reaction of aluminum, hydrogen and ethylene, using an excess of Al and $H_2$, at 100° C. under 200 atm. Upon decomposition with 2-ethylhexyl alcohol this product releases a gas containing 30.5% hydrogen, 2% butane, the balance being ethane. The product is therefore essentially $Et_2AlH$.

After the introduction of this metalorganic hydride, the mass is stirred under nitrogen for 15 minutes at 60° C. and then ethylene is introduced. The mass is heated between 60° and 70° C. for one hour, while keeping in the autoclave a constant pressure of 10 atm. Thereafter a further heating at 75° C. and 15 atm. for additional 90 minutes is conducted.

The product discharged from the autoclave is distilled under high vacuum to obtain 770 g. of a distillate exhibiting the following analytical characteristic: $Al=21.9\%$ and $Cl=29.2\%$. Upon decomposition with 2-ethylhexyl alcohol, 372 N ml./g. of a gas released containing (by moles) 96% ethane, 1.5% butane and 2.5% hydrogen. This product is therefore composed essentially of $Et_2AlCl$.

EXAMPLE 5

310 g. of $AlCl_3$ (2.33 moles) and 450 g. of $Et_2AlH$ (with 28% of Al thus containing 4.67 g. atoms of Al) are charged into an autoclave under a nitrogen atmosphere. The mass is heated, while stirring, in the nitrogen atmoshpere at a temperature up to 60° C. and ethylene is introduced under 10 atm., while the reaction temperature rises up to 75° C. The reaction is operated for one hour under these temperature and pressure conditions, then brought up to 95° C. and stirred at this temperature for 4 additional hours, while maintaining an ethylene pressure of 15 atm.

The discharged product, upon decomposition with 2-ethylhexyl alcohol, releases 347 N ml./g. of a gas containing (by moles) 97% ethane, 1.7% butane and 1.2% hydrogen. The product is subsequently distilled to yield 800 g. of a clear liquid possessing the composition: $Al=22\%$ and $Cl=28.7\%$; upon decomposition with 2-ethylhexyl alcohol a gas is released which contains 96.7% ethane and 1.4% butane. The product is therefore $Et_2AlCl$.

The yield, with respect to aluminum and chlorine, is 93%. The distillation residue is made up of 63 g. of a product which upon decomposition with 2-ethylhexyl alcohol releases 290 N ml./g. of a gas containing (by moles) 72% ethane, 14% butane and 12.5% hydrogen.

EXAMPLE 6

Into an autoclave there is charged, under nitrogen atmosphere, 345 g. of $AlCl_3$ (2.6 moles) and a mixture, prepared for this purpose (from AlEt₃ and Et₂AlH, composed of 222 g. of AlEt₃ and 323 g. of Et₂AlH similar to the one employed in Example 5). In the mixture of both these organometallic compounds there is thus present 5.27 g. atoms of aluminum.

The mass is heated at 60° C. maintained under stirring in a nitrogen atmosphere at said temperature for one hour, and then ethylene is introduced under low pressure, while using the reaction heat to achieve a temperature of 75° C. The mass is then kept at this temperature under constant pressure of 15 atm. for 3 hours. The product discharged from the autoclave is distilled under high vacuum, to obtain 770 g. of a clear liquid possessing the following analytical characteristics: Al=22% and Cl= 28.9%. Upon decomposition with 2-ethylhexyl alcohol, 350 N ml./g. of a gas are released containing (by moles) 95.7% ethane, 2% butane and 0.5% hydrogen. This product is essentially Et₂AlCl.

EXAMPLE 7

170 g. of AlCl₃ (1.28 moles) are charged in autoclave under nitrogen together with 397 g. of a hydride product prepared from aluminum, hydrogen and isobutene, while operating with reduced amounts of isobutene at 120° C. under 200 atm.

This hydride product has an aluminum content of 17.85% and upon decomposition with 2-ethylhexyl alcohol it releases 422 N ml./g. of gas containing (by moles) 33% hydrogen, 63% isobutane and 2.3% n-butane. It is therefore formed essentially of diisobutylaluminum monohydride, wherein 2.62 g. atoms of aluminum are present.

The autoclave is heated, under nitrogen while stirring at 60° C., and then 440 g. of isobutene are slowly added. The resulting mass is brought to 75° C. and stirred at said temperature for 3 hours. The discharged product is distilled to obtain 590 g. of a clear liquid possessing the following analytical characteristics: Al=15% and Cl= 20.4%. Upon decomposition with 2-ethylhexyl alcohol, 244 N ml./g. of a gas are released with the following molar composition: isobutene=97%, n-butane=0.5% hydrogen=0.7%. The product is thus essentially diisobutylaluminum monochloride as can be seen from the following corresponding theoretical values therefor: Al=15.2% Cl=20.1%; theoretical amount of released gas=254 ml./g.

EXAMPLE 8

210 g. of AlBr₃ (0.79 mole) are charged into an autoclave under nitrogen atmosphere, together with 150 g. of a product comprising essentially Et₂AlH (possessing 28.6% of aluminum, 1.58 g. atoms of aluminum, and prepared from aluminum, hydrogen and ethylene, while operating with reduced amounts of ethylene at 100° C. under 200 atm.).

The mass is heated at 60° C., while maintaining agitation and while under a nitrogen atmosphere for one hour. Ethylene is then charged, at first under low pressure, while allowing the temperature to rise up to 75° C., then under a pressure of 15 atm. The whole ethylene addition step lasts 2 hours and 30 minutes.

The discharged product is distilled under high vacuum, to obtain 380 g. of a clear liquid exhibiting the following analytical characteristics: Al=15.6%, and Br= 46.7%. Upon decomposition with 2-ethylhexyl alcohol, 275 N ml./g. of a gas are released which is composed (by moles) of 98.5% ethane, 1.2% butane and 0.3% hydrogen. The product is thus essentially Et₂AlBr (corresponding theoretical amounts: Al=16.36%, and Br=48.47%).

EXAMPLE 9

Into an autoclave there is charged, while under a nitrogen atmosphere, 210 g. of AlI₃ (1.25 moles) and 231 g. of a hydride product containing a 28.6% aluminum essentially composed of Et₂AlH, and prepared from aluminum, hydrogen and ethylene, using reduced amounts of ethylene. Upon decomposition with 2-ethylhexyl alcohol the hydride product releases 678 N ml./g. of a gas containing (by moles) 30% hydrogen, 67% ethane and 2% butane. This product possesses 2.45 g. atoms aluminum.

The mass is heated at 60° C., under a nitrogen atmosphere, and stirred at this temperature for one hour. Then ethylene is charged, at first, under low pressure for one hour, while raising the temperature to 75° C., then under a pressure of 15 atm. The entire ethylene addition lasts 2 hours and 30 minutes.

The discharged product is distilled under high vacuum, to obtain 708 g. of a clear liquid exhibiting the following analytical characteristics: Al=12.55%, and I=57.3%. Upon decomposition with 2-ethylhexyl alcohol, 207 N ml./g. of a gas are released possessing the following molar composition: ethane=98.5%, butane=1.3%, hydrogen=0.2%. The product is thus essentially Et₂AlI (corresponding theoretical values: Al=12.7%, I= 59.8%).

Many variations and modifications can, of course be practiced without departing from the scope and spirit of the present invention.

Having thus described the invention, what it is desired to secure and claim by Letters Patent is:

1. A process for preparing dialkylaluminum monohalides which comprises reacting in two distinct steps (1) a dialkyl aluminum monohydride, (2) aluminum trihalide and (3) an olefin; the first step of said process comprising mixing the dialkylaluminum monohydride with the aluminum trihalide in a molar ratio of about 2:1 and heating the mixture at a temperature of from about 50° to 100° C.; and the second step of said process comprising adding at least 1 mol of the olefin per mol of the dialkylaluminum monohydride under a pressure of from about 1 to 20 atmospheres to the mixture obtained in said first step and heating at a temperature of from about 50 to 100° C.

2. The process of claim 1 wherein the heating in said first step is carrried out at a temperature of about 60° C. under normal pressure.

3. The process of claim 1 wherein the heating in said second step is carried out at a temperature from about 70° to about 85° C.

4. The process of claim 1 wherein the corresponding trialkyl aluminum is present in admixture with the dialkylaluminum monohydride employed.

5. The process of claim 1 wherein said first step is carried out under a nitrogen atmosphere.

6. The process of claim 1 wherein the reactants are (1) diethylaluminum monohydride, (2) aluminum trichloride and (3) ethylene.

7. The process of claim 1 wherein the reactants are (1) diisobutylaluminum monohydride, (2) aluminum trichloride and (3) isobutene.

References Cited

UNITED STATES PATENTS 3,086,038    4/1963    Gould _____ 260—448

TOBIAS E. LEVOW, *Primary Examiner.*